United States Patent [19]

Westerlund

[11] Patent Number: 4,776,540
[45] Date of Patent: Oct. 11, 1988

[54] METHOD OF ORIENTING A SYNCHRONOUS SATELLITE

[75] Inventor: Lawrence H. Westerlund, Rockville, Md.

[73] Assignee: Communications Satellite Corporation, Washington, D.C.

[21] Appl. No.: 133,249

[22] Filed: Dec. 10, 1987

Related U.S. Application Data

[63] Continuation of Ser. No. 914,980, Oct. 3, 1986, abandoned.

[51] Int. Cl.$^4$ .............................................. B64G 1/24
[52] U.S. Cl. .................................. 244/164; 244/169; 244/170; 244/171; 342/355
[58] Field of Search ................ 244/158 R, 164, 169, 244/170, 171; 343/352, 354, 358, 359; 342/355, 356

[56] References Cited

U.S. PATENT DOCUMENTS

| | | | |
|---|---|---|---|
| 3,341,151 | 9/1967 | Kampinsky | 342/355 |
| 3,836,969 | 9/1974 | Bond et al. | 342/356 |
| 4,084,772 | 4/1978 | Muhlfelder | |
| 4,599,619 | 7/1986 | Keigler et al. | |

OTHER PUBLICATIONS

"A Control Method of Antenna Pointing Error Due to Orbital Inclination for a Spin-Stabilized Satellite", T. Izumisawa et al., American Institute of Aeronautics & Astonautics, N.Y., 34th Congress of the International Astronautical Federation, Oct. 10-15, 1983, pp. 1-7.
"A Satellite System for Avoiding Serial Sun-Transit Outages and Eclipses", C. W. Lundgren, Bell System Technical Journal, Oct. '70, pp. 1943-1973, Summit, N.J.
"Efficient Spacing of Synchronous Communication Satellites", Harrison E. Rowe, et al., pp. 2379-2433, Bell System Technical Journal, Dec., 1968, Summit, N.J.

Primary Examiner—Galen Barefoot
Attorney, Agent, or Firm—Sughrue, Mion, Zinn, Macpeak & Seas

[57] ABSTRACT

The invention is a method of orienting a satellite in a geosynchronous orbit so as to direct a beam from an antenna mounted on the satellite to cover a desired target site, and pointing the beam axis at a desired bore site target. One embodiment of the method according to the invention includes a step of orienting the spin axis of a geosynchronous satellite at a direction angle which equals the inclination angle of the current orbital plane plus an adjustment or correction angle ($\beta$), when the inclination angle is greater than zero. The correction angle is determined using one or both of the following equations:

$$\beta = BS - \tan^{-1}\{[\sin(bs\text{-}I)]/[6.61 - \cos(bs\text{-}I)]\},$$

or $$\beta = |-(BS - \tan^{-1}\{[\sin(bs+I)]/[6.61 - \cos(bs+I)]\})|,$$

where, BS = the elevation angle of the bore site target in spacecraft coordinates, bs = the latitude of the bore site target, I = the inclination angle of the orbital plane with respect to the equatorial plane, and $\beta$ = the correction angle with respect to orbit-normal to point the axis of the beam at the desired bore site target. The step of orienting the satellite at the direction angle is performed by using thrusters. A magnetic torquing system could also be used.

10 Claims, 9 Drawing Sheets

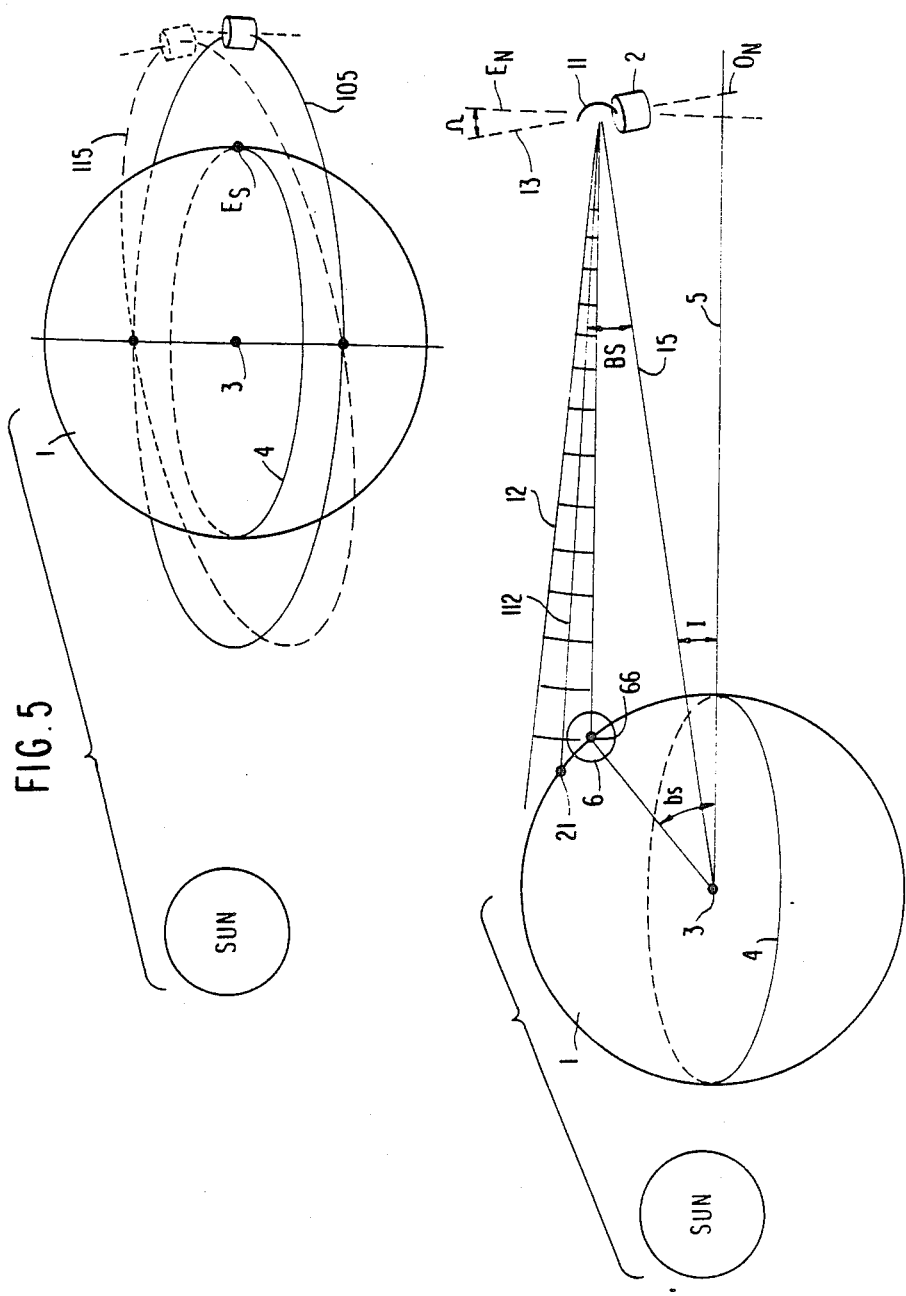

METHOD OF ORIENTING A SYNCHRONOUS SATELLITE

This application is a continuation of Ser. No. 914,980 filed Oct. 3, 1986 now abandoned.

BACKGROUND OF THE INVENTION

This invention described herein is a method for orienting spacecraft, and more specifically, is a novel method for maintaining a satellite in a synchronous orbit in a way which uses substantially less fuel than conventional methods.

With reference to FIG. 1, it is known that a satellite 2 orbiting the earth 1 at a distance A of approximately 6.61 times the radius $R_E$ of the earth (one earth radius $R_E$ is about 3964 miles or 6378 kilometers) from the center 3 of the earth will orbit the earth in a sidereal day, i.e. the period of time for the earth to complete its rotation (23 hours, 56 minutes and 4 seconds). Therefore, a satellite 2 in such an orbit is known as a geosynchronous satellite. When the orbit of the satellite 2 is in a plane 5 encompassing the equator 4 (equatorial plane 5), the satellite, as viewed from a subsatellite point $E_S$ on the equator, will appear stationary. Therefore, a satellite in a geosynchronous orbit in the equatorial plane is referred to as a geostationary satellite.

In actuality, as shown in FIG. 2, the satellite 2 in a geostationary orbit will experience departures from an ideal orbital path P. The departures are caused mainly by attraction forces such as the gravitational pulls of the sun and moon, and the oblateness of the earth. Due to the departures, the satellite 2 will appear to be moving in a small cyclical pattern during any given sidereal day, as viewed from the subsatellite point $E_S$. Movements of the satellite above the equatorial plane 5 are referred to as excursions to the north N, and movements below the equatorial plane 5 are referred to as excursions to the south S. Movements to the left or right of the point on the orbital path P at which the satellite is located are referred to as excursions to the east E or the west W, respectively. If these excursions are prevented, then the satellite 2 will appear stationary to a viewer located at the subsatellite point $E_S$, as previously mentioned.

As is well-known in the art, the satellite 2 may be stabilized by rotational inertia about a spin axis or angular momentum axis 13 (hereinafter, spin axis includes angular momentum axis), as shown in FIG. 1. Satellites are stabilized in orbit by means of an internal gyroscope, a rotating portion of structure, firing thrusters or a combination thereof. As used herein, satellites stabilized by rotating a portion of their structure, such as a Hughes type 376 satellite, are called spin stabilized. These satellites also employ thrusters for attitude control. The spin axis 13 of the satellite 2 in a geostationary orbit is usually kept at equatorial-normal $E_N$ (perpendicular to the equatorial plane 5). However, due to forces such as "solar pressure" (photons striking the satellite), the spin axis 13 will tend to precess. Controlling the amount of precession is referred to as spin axis attitude control.

In communications satellites and the like, it is conventional to use geostationary satellites so that a generally conical beam 12 from an antenna 11 on the satellite 2 can continuously cover a specified region of the earth, e.g. the continental U.S. In FIG. 1, to aid in the understanding of the geometry involved in methods of orienting geostationary satellites, the target region is illustrated as a relatively small region 6 and the equatorial orbital plane 5 is depicted as intersecting the antenna 11 rather than the center of mass of the satellite. However, if the position of the satellite 2 is not controlled, the satellite initially in a geostationary orbit will experience the above-mentioned departures. For example, the plane in which the satellite 2 orbits (orbital plane) will incline with respect to the equatorial plane 5 at a rate between 0.75° to 0.95° per year. East/west excursions as well as precessions or attitude changes of the spin axis 13 will also occur. As a result, the axis 112 of the beam 12 will be shifted from a bore site target 66. The shifting of the beam axis 112 can become sufficiently large so that the beam 12 will not adequately cover the target site 6. Therefore, to keep the satellite 2 stationary so that the beam 12 covers the target site 6 and the beam axis 112 points at the bore site target 66, operations known as stationkeeping and spin axis control are performed. That is, the north/south excursions, east/west excursions and the attitude of the spin axis 13 are controlled in a well-known manner, so that the satellite 2 is kept substantially in the equatorial plane 5 with the spin axis at a desired attitude. Therefore, the cyclical "figure eight" pattern shown in FIG. 2 is kept very small, and the beam 12 is kept essentially stationary on the target site 6.

Currently, satellites are provided with thrusters and fuel (or other propellants) for performing stationkeeping. As is well-known in the art, the necessary thrusting parameters (e.g. thruster on time and phasing or frequency of thrusting) to achieve a desired orbital position are determined using an orbital mechanics computer program. By commanding the satellite 2 to implement the calculated thrusting parameters, the satellite may be kept substantially in the desired geostationary orbit.

Stationkeeping in accordance with current technique requires a large amount of fuel for the thrusters. Since fuel is heavy and weight limitations are critical considerations in the design of a satellite, it is common that the limit on a geostationary satellite's useful life is determined by the amount of on board fuel available for the thrusters. For example, a conventional satellite such as COMSTAR (Trademark), uses an average of 37 pounds of fuel for stationkeeping during each year of the latter part of its design life. Of the 37 pounds of fuel consumed in a year, approximately 34 pounds are used for north/south correction, while only 2 pounds are used for east/west correction and 1 pound for attitude control. Since such a conventional satellite is provided with approximately 340 pounds of fuel and uses more of that fuel in the earlier part of its design life, it is expected to run out of fuel in just over 7 years. When a satellite is out of fuel, the excursions and tilting can no longer be controlled. Therefore, the antenna 11 cannot be kept continuously pointed at the target site 6 and the satellite's usefulness ends.

Currently, only a limited amount of fuel in stored on board, as the design weight of satellites is strictly controlled. Due to this limited supply of fuel, the useful life of a satellite is normally determined by the amount of fuel stored on board. Thus, the prior art suffers from the disadvantage that a substantial portion of a satellite's weight must be fuel, and the useful life of the satellite is severely limited by its fuel capacity. Moreover, the satellite must be launched substantially into the equatorial plane. If the satellite is not launched accurately, fuel must be expended to move the satellite substantially into the equatorial plane.

A proposed method for keeping the antenna of a body-stabilized satellite pointed at the target site without north/south correction is disclosed in U.S. Pat. No. 4,084,772 (hereinafter, "the '772 patent). In the proposed method, the body-stabilized satellite has a pitch axis of a type automatically kept along a line normal to the orbital plane (orbit-normal) by a closed loop roll control system. The method further involves equipping the satellite with a transverse momentum wheel mounted with its momentum axis parallel to the yaw axis, and varying the transverse momentum vector in a sinusoidal pattern having a period equal to the orbital period in order to vary the position of the pitch axis with respect to orbit-normal and point the satellite's antenna at the bore site target. The proposed method thus involves corrections being made continuously during each orbit, and using a satellite equipped with a closed loop roll correcting system. However, equipping a satellite with a closed loop roll correcting system necessitates increasing the weight of the satellite. Moreover, spin stabilized satellites generally do not have such a closed loop control system, and it would be expensive to provide a spin stabilized satellite with such a system. In addition, the method of the '772 patent cannot be used in satellites lacking a transverse momentum wheel. Thus, the method cannot be used on many satellites currently in orbit. Further, to design and build satellites with a transverse momentum wheel will increase the weight of the satellite and increase the cost thereof.

SUMMARY OF THE INVENTION

It is an object of the invention to solve the aforementioned problems of orienting a satellite in a geosynchronous orbit.

In general, the method according to the invention involves determining an angle, with respect to equatorial-normal, at which to orient the spin axis of a geosynchronous satellite so that a beam from an antenna mounted on the satellite will cover a desired target site or area, and then orienting the spin axis at the determined angle. In one embodiment of the invention, the calculated angle is such that the axis of the beam will be pointed at a desired bore site target.

A first embodiment of the method according to the invention includes a step of orienting the spin axis of a geosynchronous satellite at a direction angle which equals the inclination angle of the plane in which the satellite is orbiting, when the inclination angle is greater than zero degrees. In other words, the first embodiment of the inventive method includes a step of orienting the spin axis at orbit-normal. The direction angle is measured in a rotational direction from a first line which represents equatorial-normal to a second line which represents orbit-normal, where the first and second lines intersect at the center of mass of the satellite.

A second embodiment of the inventive method includes a step of orienting the spin axis of a geosynchronous satellite at a direction angle which equals the inclination angle of the orbital plane plus an adjustment or correction angle, when the inclination angle is greater than zero degrees. In other words, the second embodiment of the inventive method includes a step of orienting the spin axis at orbit-normal plus the correction angle. The correction angle is determined by using one of the following equations:

$$\beta = BS - \tan^{-1}\{[\sin (bs-I)]/[6.61 - \cos (bs-I)]\},$$

or $$\beta = |-(BS - \tan^{-1}\{[\sin (bs+I)]/[6.61 - \cos (bs+I)]\})|,$$

where, BS=the elevation angle of the bore site target in spacecraft coordinates, bs=the latitude of the bore site target, I=the inclination angle of the orbital plane with respect to the equatorial plane, and $\beta$=the correction angle with respect to orbit-normal.

In the second embodiment, the direction angle is also measured in a rotational direction from a first line which represents equatorial-normal to a second line which represents orbit-normal, where the first and second lines intersect at the center of mass of the satellite.

The correction angle $\beta$ can also be chosen from anywhere in the range between the two values which the above two equations yield, including an average of those values. In addition, where the inclination angle is sufficiently small, or the beam from the antenna is sufficiently wide, the direction angle can be chosen anywhere within a range of values which will enable the beam to adequately cover the target site. For example, the direction angle could be chosen from anywhere within a range such as from the inclination angle to the inclination angle plus two times the correction angle.

The step of orienting the spin axis can be performed by firing thrusters.

The method for orienting a geosynchronous satellite according to the invention can be easily performed, as all of the necessary mechanisms, to carry out the method are well-known in the art. Therefore, the advantage of vastly prolonging the useful life of a satellite by reducing or discontinuing north/south stationkeeping can be easily achieved, even with satellites already in orbit. Moreover, in designing new satellites, the necessary fuel to be stored on board can be greatly reduced. In addition, it is not necessary to accurately launch the satellite into the equatorial plane to avoid wasting fuel.

BRIEF DESCRIPTION OF THE DRAWINGS

The above-mentioned objects, features and advantages as well as additional objects, features and advantages of the invention will be evident from the following detailed description of the invention, with reference to the accompanying drawings, in which:

FIG. 5 is an explanatory diagram showing the corresponding orbits of a satellite in the orbital and equatorial planes of FIG. 4, respectively;

FIG. 6 is an explanatory diagram showing the satellite in the orbital plane of FIG. 3 at midnight after a step of orienting the spin axis according to the first embodiment of the inventive method has been performed;

DETAILED DESCRIPTION OF THE PREFERRED EMBODIMENTS

Figure 1:
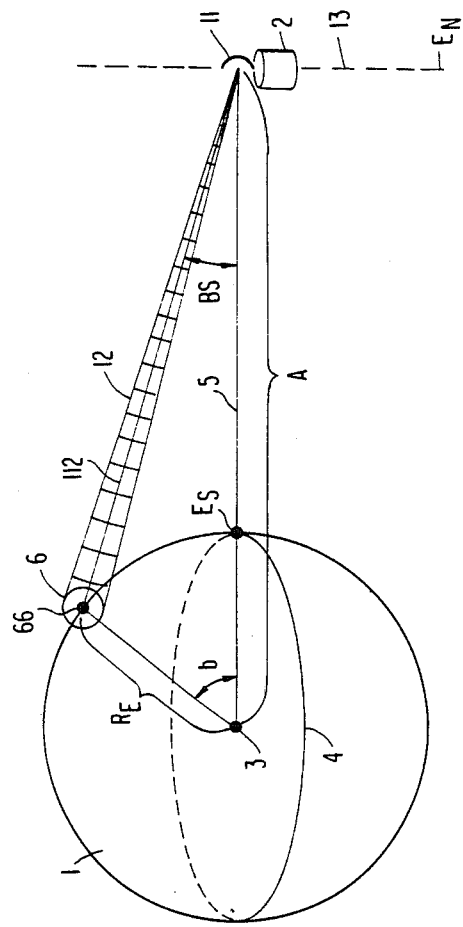
FIG. 1 is an explanatory diagram showing a satellite in a conventional geostationary orbit.
Figure 2:
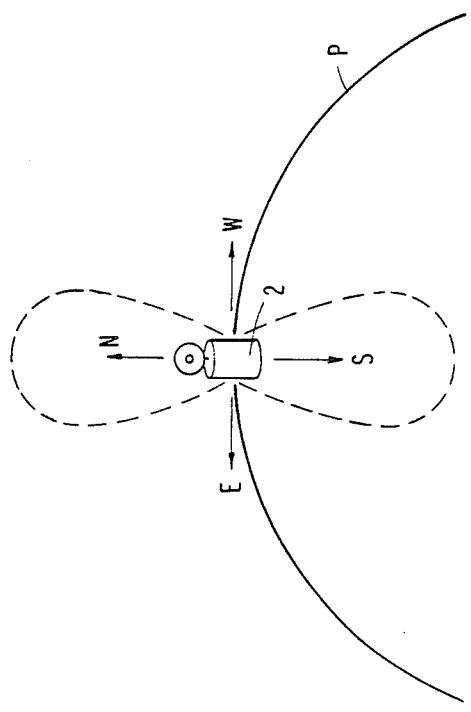
FIG. 2 is an explanatory diagram of the daily motion, as viewed from the subsatellite point, of a satellite which is in an orbit slightly out of the equatorial plane.

The method of the present invention can be used to increase the useful life of a conventional satellite by approximately a factor of ten given the same amount of fuel (or other propellants) stored on board the satellite.

The method according to a first embodiment of the invention includes a step of orienting the spin axis or angular momentum axis (hereinafter, spin axis includes angular momentum axis) of a satellite, stabilized by rotational inertia, at a position perpendicular to the plane in which the satellite is orbiting the earth (i.e. orbit-normal). The method according to a second embodiment of the invention includes a step of orienting the spin axis of the satellite at a position of orbit-normal plus an adjustment or correction angle. In this way, the central axis of a beam from an antenna mounted on the satellite can be kept pointed at a desired bore site target despite elimination of north/south stationkeeping. Thus, the amount of fuel stored on board a conventional satellite may be greatly reduced. In addition, a vastly increased design life for a given satellite can be achieved.

In the following portion of this detailed description of the invention, like reference numerals refer to like elements.

Figure 3:
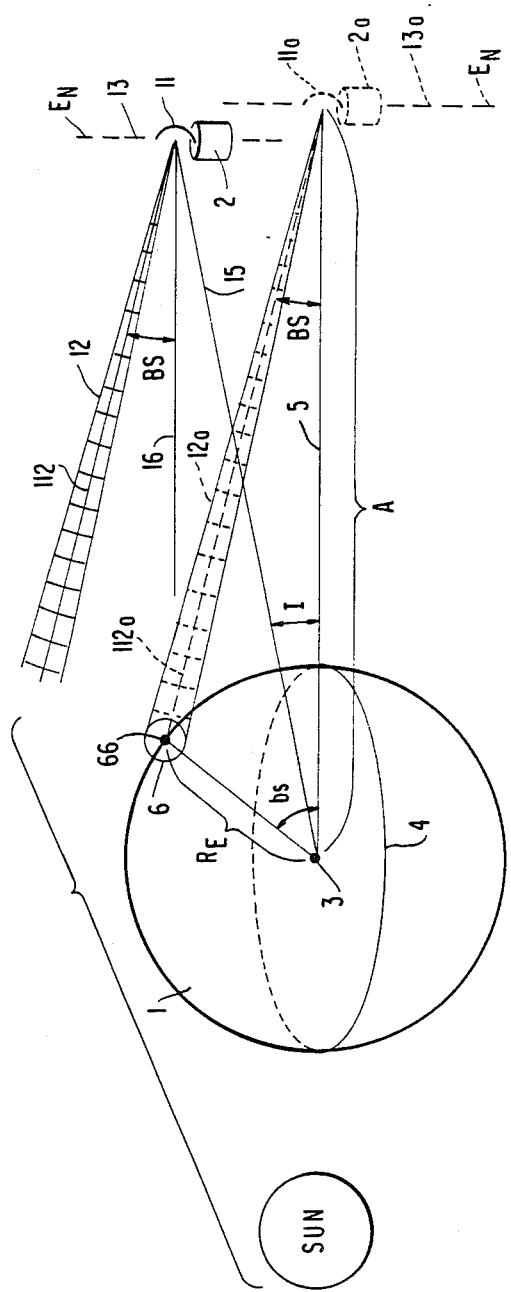
FIG. 3 is an explanatory diagram showing a satellite at the point of maximum ascension, which is assumed to occur when the satellite is at the midnight meridian (midnight satellite time), in an orbital plane at an inclination with respect to the equatorial plane.

As shown in FIG. 3, without north/south stationkeeping, a satellite 2 which was originally in a geostationary orbit will experience north/south excursions. The original, geostationary orbit was in equatorial plane 5 encompassing equator 4, with the satellite 2 at an altitude A of approximately 6.61 earth radii $R_E$ from the center 3 of earth 1. At any given time after the excursions begin, the satellite 2 is in an orbital plane 15 which can be described by an inclination angle I with respect to the equatorial plane 5. The equatorial and orbital planes 5 and 15, respectively, which are represented only by single lines in FIG. 3, are shown in FIG. 4, in which the "tilt" (rotation) of the orbital plane 15 relative to the equatorial orbital plane 5 is easier to observe.

In the past, these north/south excursions have been corrected before becoming significant, i.e., so that the satellite 2 would remain in or substantially in the equatorial plane 5 and a beam 12 from an antenna 11 mounted on the satellite (each represented by solid lines in FIG. 3) would continue to cover the target site 6, as shown in FIG. 3 by a beam 12a from an antenna 11a mounted on a satellite 2a (each represented by broken lines). The two satellites 2 and 2a are depicted with their respective antennae 11 and 11a in the orbital and equatorial planes 15 and 5, respectively, rather than their respective centers of mass, to aid in understanding the geometry involved in methods of orienting a satellite. In addition, since a synchronous satellite is approximately 5.61 earth radii $R_E$ from the surface of the earth 1, the satellite including the antenna can be considered as a point source as viewed from the earth.

A bore site target 66 of the target site 6 (e.g. Kansas City might be the bore site target of a beam intended to cover the continental U.S.) at which the beam axis 112a of the beam 12a is aimed, is at an angle bs in earth coordinates or a latitude bs (i.e., an angle bs with respect to the equatorial plane 5 and the center 3 of the earth 1). Further, as can be seen in FIG. 3, the beam axis 112a of the beam 12a forms an elevation angle BS measured in spacecraft coordinates (i.e., with respect to the equatorial plane). That is, in general, the elevation angle BS of the bore site target (66) in spacecraft coordinates is defined as an angle of a central axis (112a) of a beam (12a) from an antenna (11a) mounted on a satellite (2a) (stabilized by rotational inertia) with respect to a plane normal to the spin axis (13a), such that when the satellite is placed in a geostationary orbit with the spin axis oriented at equatorial-normal ($E_N$), the axis of the beam will strike the bore site target. On a COMSTAR (trademark) satellite, the elevation angle of the bore site target in spacecraft coordinates, i.e., the angle of propagation of the beam axis with respect to a plane perpendicular to the spin axis is fixed at approximately 6.3°, and the bore site target 66 is within the continental U.S. and at approximately an angle of 40° in earth coordinates. Thus, by definition, when the spin axis 13a is oriented at equatorial-normal $E_N$, and the satellite 2a is at an altitude A of approximately 6.61 earth radii $R_E$ from the center 3 of earth 1 and in the equatorial plane 5, the beam axis 112a will be pointed at the bore site target 66.

Figure 4:
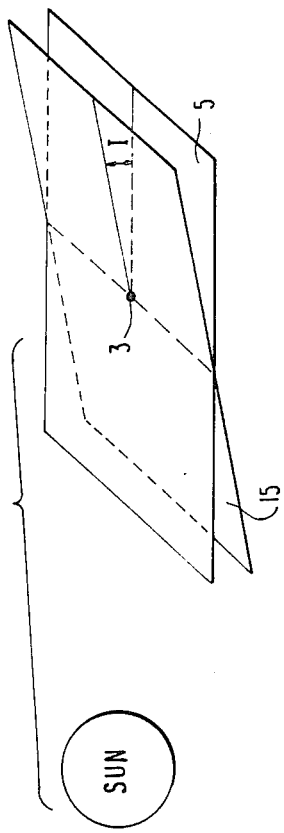
FIG. 4 is an explanatory diagram showing the relationship of the orbital and equatorial planes of FIG. 3 in detail.

With reference to FIGS. 4 and 5, the north/south movement during a sidereal day (roughly twenty-four hours) can be better understood. The orbital plane of the satellite is in the equatorial plane 5 (FIG. 4) and its orbit 105 (FIG. 5) remains in that plane. The orbit 105 and orbit 115 have been depicted in FIG. 5 as exaggerated ellipses to better illustrate the relationship between the orbits, although the orbits are usually kept generally circular by using east/west stationkeeping. To an observer at subsatellite point $E_S$ on the equator 4 (FIG. 5), directly below the satellite, the satellite would appear stationary because the satellite revolves around the earth in a sidereal day. Due to various phenomena, the orbital plane tilts (rotates) very slowly. After a long period of time, for example, and assuming no north/south correction of the satellite, the satellite's orbit will be as shown at 115 (FIG. 5) in the plane 15 (FIG. 4). For purposes of illustration, assume that the sun is located as shown in FIGS. 4 and 5, such that the satellite is opposite the sun, i.e. on the midnight meridian (hereinafter, "midnight"). Further, assume that the satellite will experience its maximum excursion to the north at midnight and its maximum excursion to the south at noon. Therefore, with respect to the subsatellite point $E_S$, the satellite moves north and south with roughly a twenty-four hour periodicity, the extent of the north/south excursions increasing gradually as the orbital plane tilts more.

Referring back to FIG. 3, the satellite 2a originally in the equatorial plane 5 is now assumed to be in an orbital plane 15 described by an inclination angle I. For purposes of reference, FIG. 3 shows a day when the maximum ascension (point in the orbital path of maximum excursion above the equatorial plane) occurs when the satellite is at midnight, as represented by the position of the sun. The maximum descension (point in the orbital path of maximum excursion below the equatorial plane) is thus assumed to occur at noon. Wherever the terms "midnight" and "noon" are used, they will refer to the points of maximum ascension and descension, respectively. However, the points of maximum ascension and descension will occur at midnight and noon, respectively, only once each year.

If the spin axis 13 of the satellite 2 at midnight is kept pointing in the same direction (usually equatorial-normal) as the spin axis 13a at which the satellite 2a in the equatorial plane 5 would normally be kept, the axis 112 of the beam 12 from the antenna 11 will be at an angle BS with respect to a plane 16 perpendicular to equatorial-normal $E_N$. The result is that the beam 12 will miss the target site 6. When the satellite 2 is at midnight (FIG. 3), the beam 12 will be too far to the north. When the satellite 2 is on the opposite side of the earth 1, the satellite 2 will be below the equatorial plane 5 (as described with reference to FIGS. 4 and 5) and the beam 12 will miss the target site 6 to the south.

The above problem has been handled for years by firing the north/south thrusters to bring the satellite back to an equatorial orbital plane. Generally, geostationary satellites are kept in an orbital plane with an inclination angle of less than 0.1°. Since the drift is slow, such corrections may be made infrequently. Regardless of the frequency of correction, the fuel requirements are so severe, relatively speaking, that they limit the satellite's useful life. Despite the tremendous economic loss due to such a short lifetime, the same basic method has continued to be used.

In accordance with the present invention, the beam may be kept on target without the fuel intensive north/south correction.

As shown in FIG. 6, the spin axis 13 of the satellite 2 at midnight has been oriented according to a first embodiment of the invention. The method according to the first embodiment includes a step of orienting the spin axis 13 of the satellite 2 at a direction angle $\Omega$ measured from equatorial-normal $E_N$, so that the spin axis is perpendicular to the orbital plane 15 when the inclination angle I is greater than zero. Since the orbital plane 15 in FIG. 6 is at an angle I with respect to the equatorial plane 5, orbit-normal $O_N$ will be at an angle I with respect to equatorial-normal $E_N$. Therefore, in this first embodiment, the direction angle $\Omega$ is equal to the inclination angle I.

Figure 7:
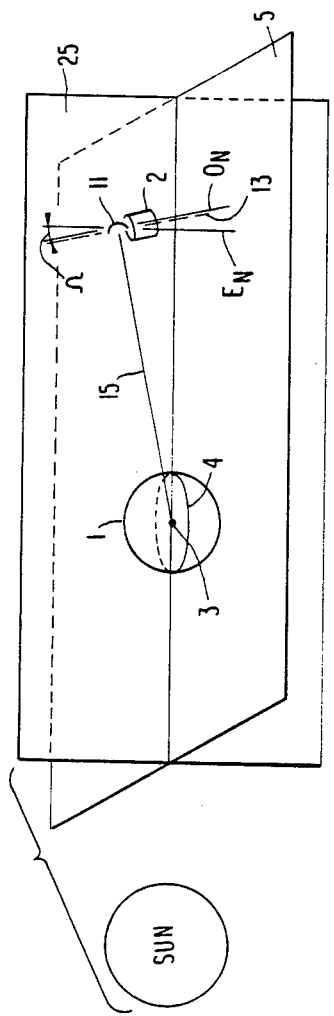
FIG. 7 is an explanatory diagram of a satellite at midnight in a geosynchronous orbit and having a direction angle according to the first embodiment of the inventive method.

The direction angle $\Omega$ is measured in a rotational direction from a first line representing equatorial-normal $E_N$ toward a second line representing orbit-normal $O_N$, where the first and second lines intersect at the orbital plane 15 where the center of mass of the satellite 2 would be. Since the satellite 2 has been drawn with the antenna 11, rather than the center of mass, in the orbital plane 15, the lines representing equatorial-normal and orbit-normal have been illustrated as intersecting at the antenna. For example, as shown in FIG. 7, when the satellite 2 is at midnight, the direction angle $\Omega$ may be measured in a plane 25 which is perpendicular to the equatorial plane 5 and encompasses the points of maximum ascension and descension as well as the center of mass of the satellite 2. When the satellite 2 is oriented at the direction angle $\Omega$ at midnight, it will appear to have a "tilt" or roll (a rotation) directly towards the earth 1.

Referring back to FIG. 6, with the spin axis oriented at orbit-normal $O_N$, the axis 112 of the beam 12 will strike the earth at a point 21. The smaller the value of the inclination angle I, the closer the point 21 will be to the bore site target 66. For sufficiently small values of the inclination angle I, the point 21 will be sufficiently close to the bore site target 66 such that the conical beam 12 will adequately cover the target site 6. The exact values of the inclination angle I for which the beam 12 will adequately cover the target site 6 will depend on various factors, including the divergence of the beam and the area of the target site.

Figure 7A:
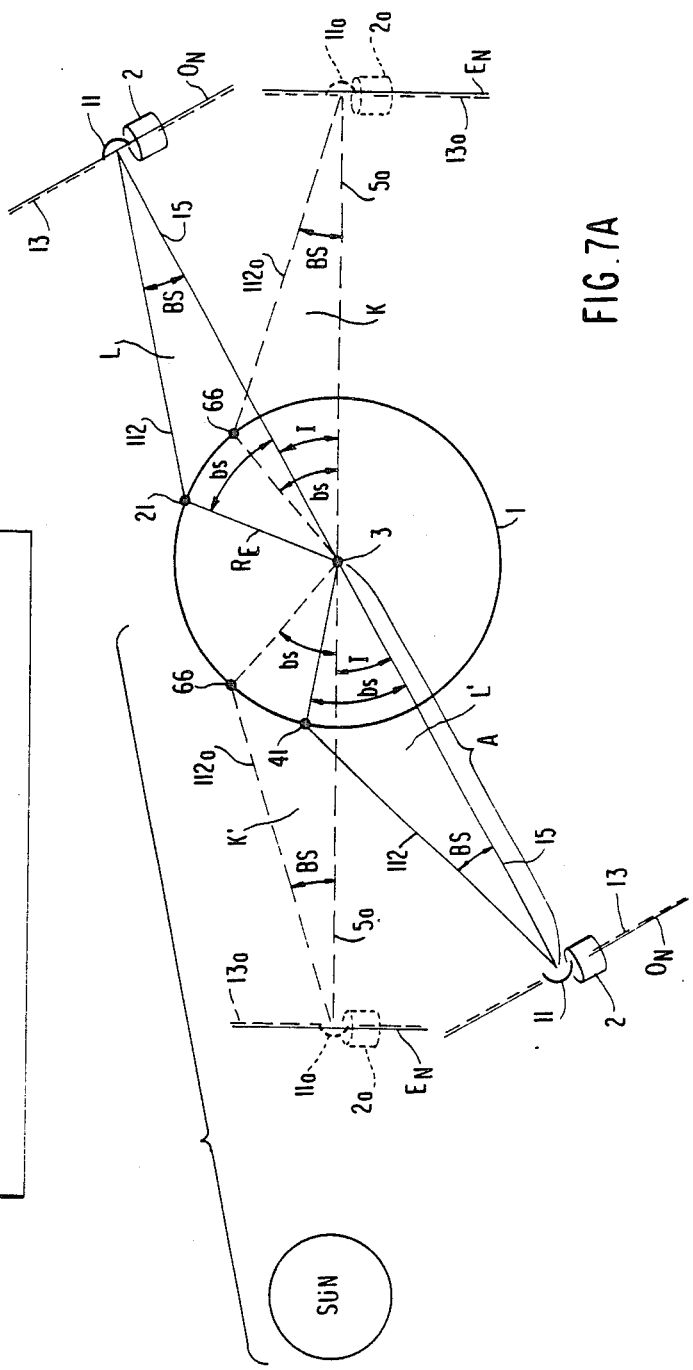
FIG. 7A is an explanatory diagram in which the right-hand portion shows where a beam axis of an antenna beam will strike the earth in relation to a bore site target when a spin axis of a satellite at midnight has been oriented according to the first embodiment of the inventive method, and the left-hand portion shows where the beam axis of the antenna beam will strike the earth in relation to the bore site target when the satellite, with its spin axis oriented according to the first embodiment of the inventive method, is at noon.

With reference to the right-hand portion of FIG. 7A, it can be determined that at midnight, the point 21 will be north of the bore site target 66. In FIG. 7A, the inclination angle I has been exaggerated so that triangles K and L can be easily compared. The point 21 will be north of the bore site target 66, as a result of the counterclockwise rotation (as viewed in FIG. 7A) of the orbital plane of the satellite from an equatorial orbital plane 5a to the inclined orbital plane 15. Hence, the triangle K, which is defined by the satellite 2a, the beam axis 112a, the point 66 at which the beam axis strikes the earth 1 and the center 3 of the earth, rotates counterclockwise to the position of the triangle L, which is defined by the satellite 2, the beam axis 112, the point 21 at which the beam axis strikes the earth and the center 3 of the earth. Since the earth 1 may be considered a perfect sphere for purposes of pointing the beam axis 112 at the bore site target 66, the triangles K and L are equal. Accordingly, the point 21 is located to the north of the bore site target 66.

Figure 8:
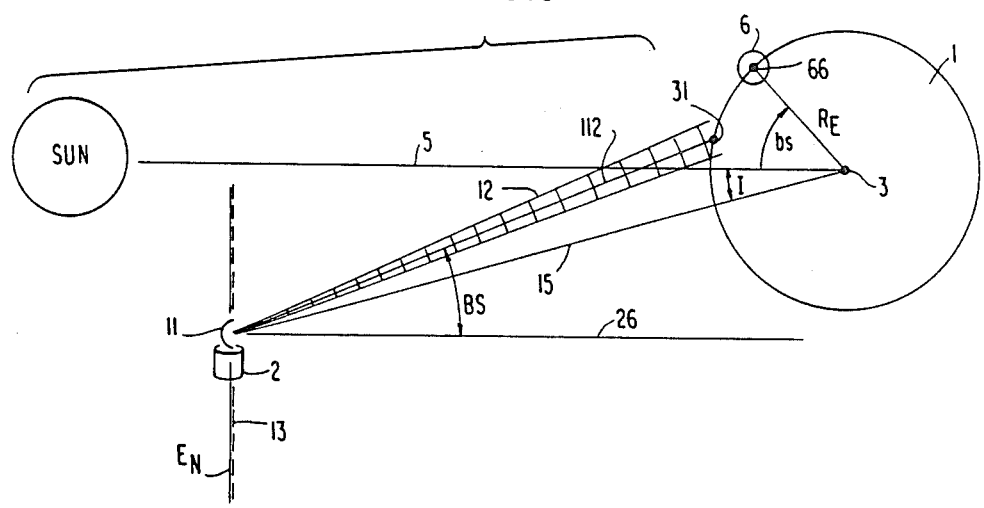
FIG. 8 is an explanatory diagram showing the satellite in the orbital plane of FIG. 3 one-half sidereal day later, at noon.

FIG. 8 shows the satellite 2 in the orbital plane 15 of FIG. 3, but one-half sidereal day later. The satellite 2 is now at nnon, the point of maximum descension, as represented by the position of the sun. As in FIG. 3, the spin axis 13 is at equatorial-normal $E_N$. Due to the excursion of the satellite 2 to the south, the beam axis 112, at the angle BS with respect to a plane 26 perpendicular to equatorial-normal $E_N$, will be shifted south of the bore site target 66 and will strike the earth at a point 31. Accordingly, the beam 12 will be shifted south of the target site 6.

Figure 9:
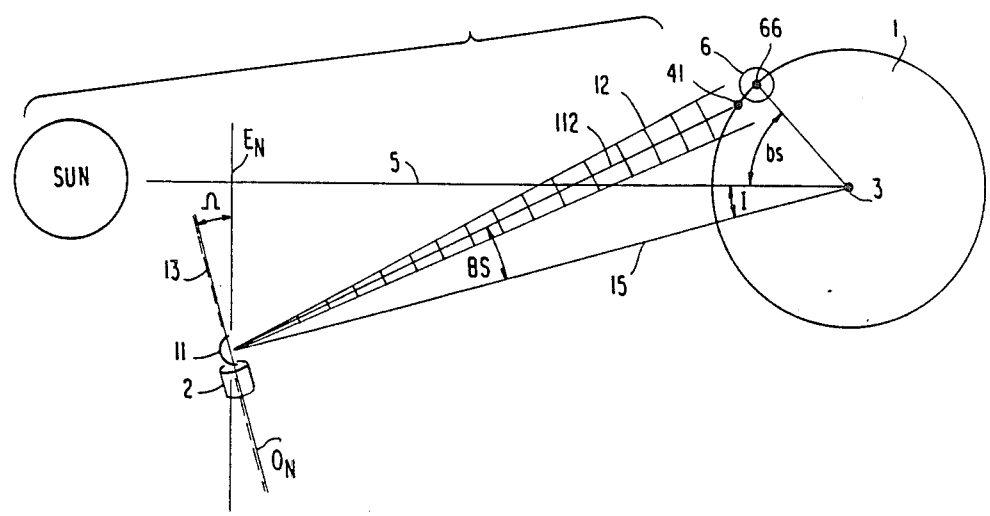
FIG. 9 is an explanatory diagram showing the satellite of FIG. 8 at noon after a step of orienting the spin axis according to the first embodiment of the inventive method has been performed.

As shown in FIG. 9, the spin axis 13 of the satellite 2 of FIG. 8 has been oriented at a direction angle $\Omega$ with respect to equatorial-normal $E_N$, according to the method of the first embodiment of the invention. The direction angle $\Omega$ can again be described as a rotation or an angle measured in a rotational direction from a first line representing equatorial-normal $E_N$ toward a second line representing orbit-normal $O_N$ where the first and second lines intersect at the center of mass of the satellite 2. Accordingly, the direcston angle $\Omega$ is measured in a plane which is perpendicular to the equatorial plane 5 and encompasses the points of maximum ascension and descension as well as the center of mass of the satellite 2. Since the orbital plane 15 is at the inclination angle I with respect to the equatorial plane 5, the amount of rotation of the spin axis 13 from equatorial-normal $E_N$ to orbit-normal $O_N$ is again equal to the inclination angle I. Therefore, the direction angle $\Omega$ is the same at both noon and midnight. However, at noon the satellite 2 will appear to have a "tilt" or roll (a rotation) directly away from the earth 1.

With the spin axis 13 oriented at orbit-normal $O_N$, the axis 112 of the conical beam 12 will strike the earth at a point 41. With reference to both FIGS. 8 and 9, it can be seen that the point 41 (FIG. 9) will be substantially closer to the bore site target 66 than the point 31 (FIG. 8). The smaller the value of the inclination angle I, the closer the point 41 will be to the bore site target 66. For sufficiently small values of the inclination angle I, the point 41 will be sufficiently close to the bore site target 66 such that the beam 12 will adequately cover the target site 6. The exact values of the inclination angle I for which the beam 112 will adequately cover the target site 6 will depend on various factors, including the divergence of the beam and the area of the target site.

With reference to the left-hand portion of FIG. 7A, it can be determined that the point 41 will be south of the bore site target 66 when the satellite 2 is at noon for the same reason that the point 21 (right-hand portion) will be north of the bore site target at midnight. In FIG. 7A, the inclination angle I has been greatly exaggerated so that triangles K' and L' can be easily compared. Due to the rotation of the orbital plane from the equatorial orbital plane 5a to the inclined orbital plane 15, the triangle K', which is defined by the satellite 2a, the beam axis 112a, the point 66 (the bore site target) at which the beam axis strikes the earth 1 and the center 3 of the earth, rotates counterclockwise to the position of the triangle L', which is defined by the satellite 2, the beam axis 112, the point 41 at which the beam axis 65 strikes the earth and the center of the earth. Since the earth 1 may be considered a perfect sphere for purposes of pointing the beam axis 112a at the bore site target 66, the triangles K' and L' are equal. Accordingly, the point 41 is located south of the bore site target 66.

Figure 10:
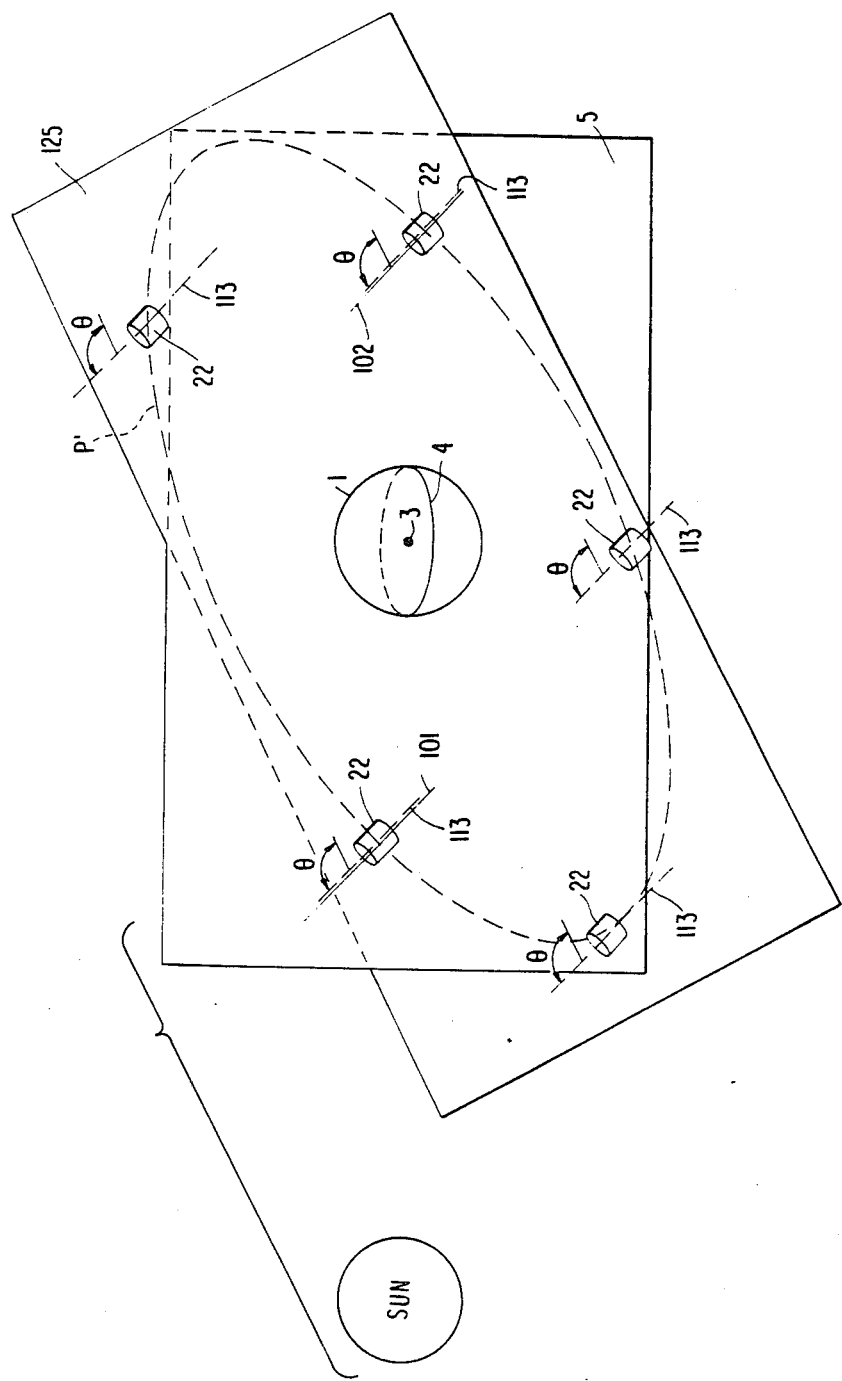
FIG. 10 is an explanatory diagram showing that the direction of the spin axis remains constant in inertial space in the absence of solar pressure and other external forces.

FIG. 10 illustrates that the orientation of the spin axis will remain the same in inertial space, absent external forces such as solar pressure. With reference to FIG. 10, once a spin axis 113 of a satellite 22 is oriented at an angle $\theta$ with respect to an orbital plane 125, the spin axis will remain oriented at the angle $\theta$ regardless of the position of the satellite in the orbital plane, so that a first reference line (e.g. line 101) along which the spin axis 113 lies when the satellite 22 is at one position in the orbital path P' will always be parallel to a second reference line (e.g. line 102) along which the spin axis lies when the satellite 22 is at any other position in the orbital path. Consequently, referring back to FIGS. 6 and 9, once the spin axis 13 of the satellite 2 at midnight is oriented at the direction angle $\Omega$ with a roll directly toward the earth 1 at midnight (FI. 6), the spin axis will be at the same direction angle and will have a roll directly away from the earth at noon (FIG. 9), without any further orientation. Similarly, if the spin axis 13 of the satellite 2 at noon is oriented at the direction angle $\Omega$ with a roll directly away from the earth 1 (FIG. 9), the spin axis will be at the same direction angle and will have a roll directly toward the earth at midnight (FIG. 6), without any further orientation. In fact, the spin axis can be corrected to be normal to the orbital plane at any point in the orbit. The correction will suffice to place the beam axis sufficiently nearly on target depending on the beam divergence and the size of the inclination angle I.

Referring back to FIG. 7, the direction angle $\Omega$ can therefore be described in general as an angle measured in a plane which encompasses the center of mass of the satellite 2 and is parallel to the plane 25 (i.e., the plane which is perpendicular to the equatorial plane 5 and encompasses the points of maximum ascension and descension). That is, for any given position of a satellite on any given orbital path, the direction angle $\Omega$ can always be described as a rotation, or an angle ($\Omega$) measured in a rotational direction, from a first line representing equatorial-normal $E_N$ toward a second line representing orbit-normal $O_N$, where the first and second lines intersect at the center of mass of the satellite 2.

Therefore, the step of orienting the spin axis at orbit-normal according to the first embodiment of the inventive method can be performed while the satellite is at any position in its orbital path. Further, once the spin axis is oriented to orbit-normal $O_N$, the spin axis will remain at orbit-normal (and the satellite will have a roll directly toward the earth at the point of maximum ascension, assumed herein to be at midnight, and directly away from the earth at the point of maximum descension, i.e. noon), as long as the inclination angle I of the orbital plane does not change. It follows that the step of orienting the spin axis at orbit-normal $O_N$ need only be made once for any given orbital plane.

The above-described first embodiment of the inventive method has been explained as an adjustment or correction of the spin axis attitude from equatorial-normal to orbit-normal to aid in the understanding of the method. The spin axis of the satellite may be oriented at the direction angle $\Omega$ (which equals the inclination angle I) with respect to equatorial-normal without ever having been oriented at equatorial-normal. In fact, the satellite can be launched directly into an inclined orbital plane with respect to the equatorial plane, and the spin axis can then be oriented at the direction angle Ω for that particular inclined plane.

As can be seen in FIGS. 6 and 9 as long as the inclination angle I is greater than zero, merely orienting the spin axis 13 at orbit-normal $O_N$ will not precisely point the beam axis 112 at the bore site target 66 throughout the entire orbit of the satellite. Depending on the need for precision and the narrowness of the cone of the beam, relatively precise pointing of the axis 112 at the bore site target 66 is important to ensure that the beam 12 will adequately cover the target site 6 at all times of the day, especially when the inclination angle I is relatively large. In addition, for certain types of satellites, relatively precise pointing is necessary for an earth station to communicate with the satellite and for purposes of tracking. Moreover, on some satellites the beam 12 is very narrow and will only cover an area very close to the size of the desired target site 6. Therefore, more precision in directing of the satellite's unidirectional antenna with respect to a desired target site or a transmitting antenna (located on the ground) is essential.

Figure 11:
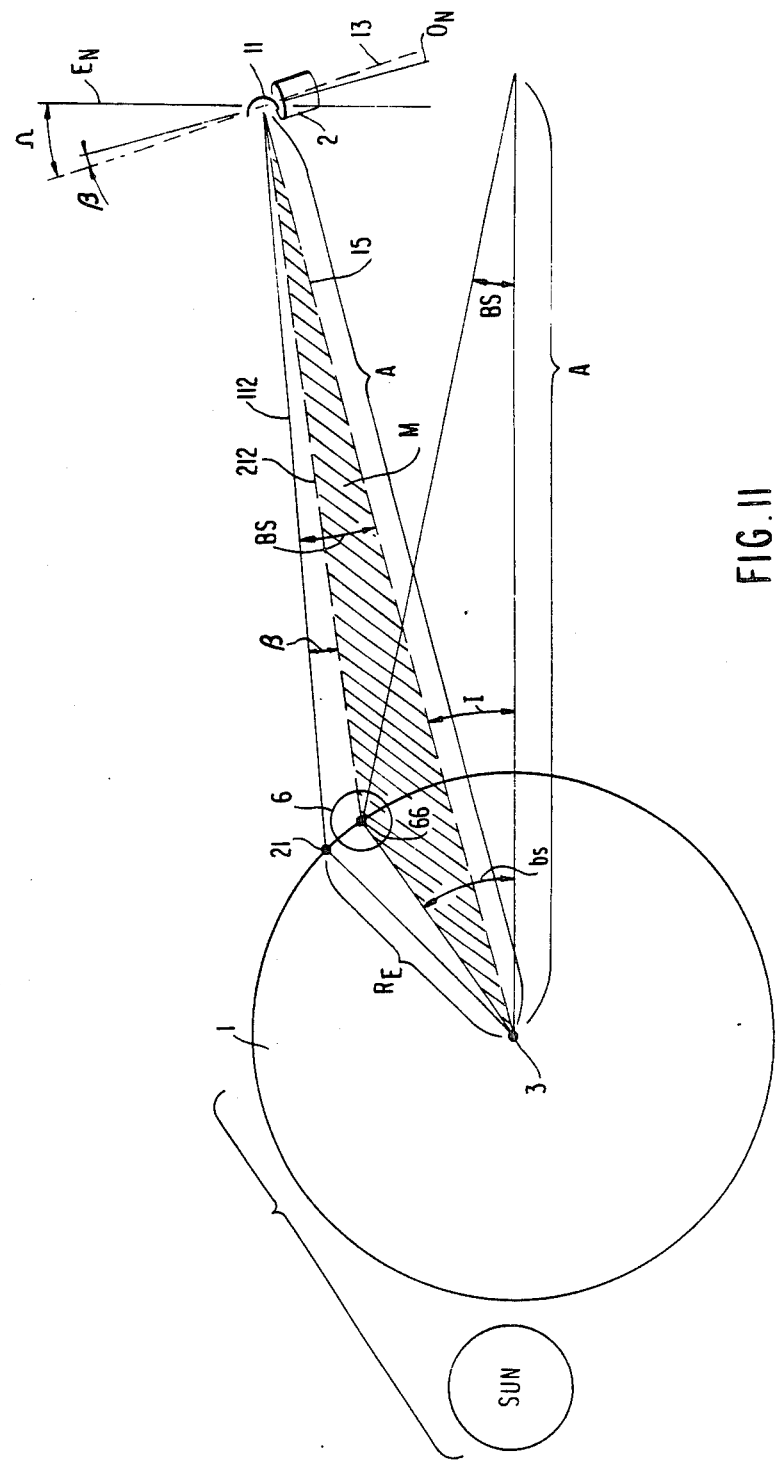
FIG. 11 is an explanatory diagram showing the satellite in the orbital plane of FIG. 3 at midnight after a step of orienting the spin axis according to the second embodiment of the inventive method has been performed.

To precisely point the beam axis 112 at the bore site target 66 when the inclination angle I is greater than zero, the spin axis 13 may be oriented at a direction angle Ω according to a second embodiment of the inventive method. Referring to FIG. 11, the angle with respect to orbit-normal $O_N$ necessary to point the beam axis 112 on the bore site target 66 is defined as an adjustment or correction angle $\beta$. Only the beam axis 112 of the conical beam has been shown to avoid confusion. As seen in FIG. 11, when the satellite 2 is at midnight, and assuming an orbital plane 15 and a spin axis 13 oriented at orbit-normal $O_N$, the beam axis represented by a line 112 will strike the earth 1 at a point 21 north of the bore site target 66. To hit target 66 with the beam axis represented by the line 212, the satellite will have to tilt further. The direction angle Ω necessary to point the beam axis at the bore site target 66 (i.e. to rotate the line 112 to the line 212) will be greater than the inclination angle I, such that the direction angle equals the inclination angle plus the correction angle $\beta$. Therefore, a second embodiment of the invention includes a step of orienting the spin axis 13 at a direction angle Ω measured from equatorial-normal $E_N$ which is equal to the inclination angle I (i.e., the amount of rotation to orbit-normal $O_N$ from equatorial-normal $E_N$) plus an adjustment or correction angle $\beta$, when the inclination angle is greater than zero.

When the satellite 2 is at its northern most point, e.g. at midnight in FIG. 11, the direction angle Ω can be described as a rotation of the spin axis 13 by the inclination angle I plus the correction angle $\beta$ in a plane perpendicular to the equatorial plane 5 and encompassing the points of maximum ascension and descension. The direction angle Ω can also be described as an angle measured in a rotational direction from a first line represented by equational-normal $E_N$ toward a second line represented by orbit-normal $O_N$, where the first and second lines intersect at the center of mass of the satellite 2. As in the first embodiment, when the spin axis 13 of the satellite 2 at midnight is oriented at the direction angle Ω, it will appear to have a "tilt" or roll (a rotation) directly towards the earth 1.

The correction angle $\beta$, which is defined as an amount of rotation of the spin axis 13 from orbit-normal $O_N$ necessary to point the beam axis at the bore site target 66, can be determined using the following equation:

$$\beta = BS - \tan^{-1}\{[\sin(bs-I)]/[6.61-\cos(bs-I)]\} \quad (1)$$

where, $\beta$ is an adjustment or a correction angle, measured from orbit-normal $O_N$, necessary to point the beam axis 112 at the bore site target 66 at the point of maximum ascension of the satellite;

I is an inclination angle of the orbital plane 15 with respect to the equatorial plane 5;

bs is the latitude of the bore site target 66 (i.e., the angle of the bore site target with respect to the center 3 of the earth 1 and the equatorial plane 5); and BS is the elevation angle of the bore site target 66 in spacecraft coordinates.

Figure 13B:
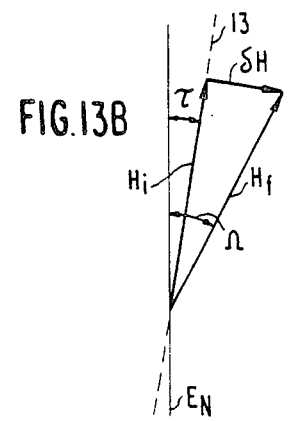
FIG. 13B is an explanatory diagram showing an incremental angular momentum vector necessary to reorient the spin axis of a satellite at a desired attitude.
Figure 13:
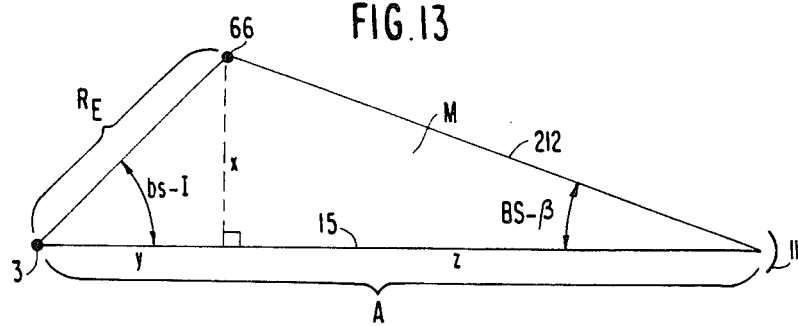
FIG. 13 is an enlarged diagram of a portion of FIG. 11 for purposes of calculating a correction angle according to the second embodiment of the inventive method.

With reference to FIGS. 11 and 13, this equation (Equation (1)), can be derived from a trigonometric analysis of a triangle M formed by the center 3 of the earth 1, the bore site target 66 and the satellite's antenna 11. The derivation of the correction angle $\beta$ is as follows:

$$\tan(BS-\beta) = x/z; \quad (2)$$

solving for $\beta$:

$$\beta = BS - \tan^{-1}(x/z); \quad (3)$$

calculating x, y and z:

$$x = R_E \sin(bs-I);$$

$$y = R_E \cos(bs-I);$$

$$z = A - y = 6.61 R_E - R_E \cos(bs-I);$$

and substituting for x and z in equation (3) and reducing:

$$\beta = BS - \tan^{-1}\{[\sin(bs-I)]/[6.61-\cos(bs-I)]\} \quad (4)$$

Figure 12:
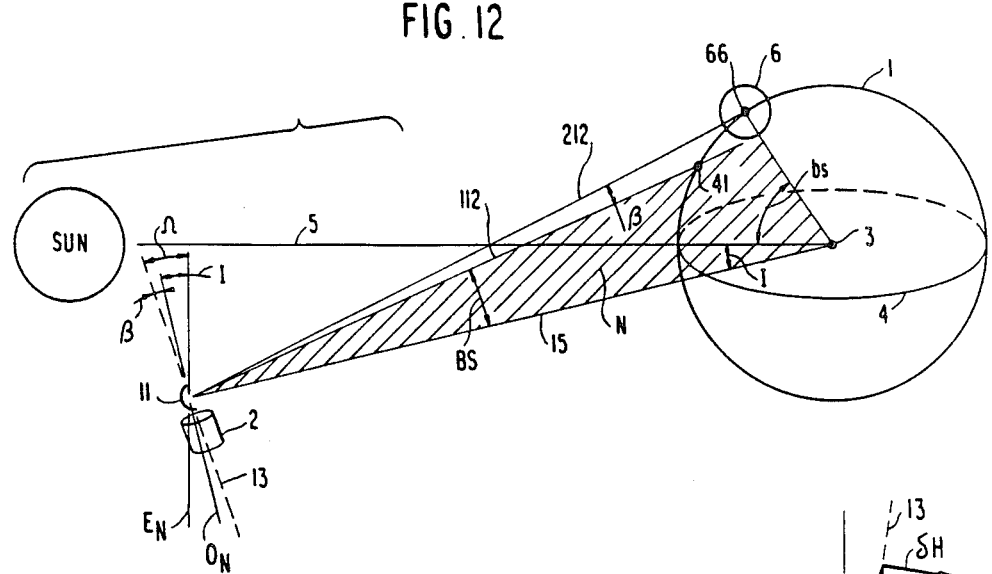
FIG. 12 is an explanatory diagram showing the satellite of FIG. 8 at noon after a step of orienting the spin axis according to the second embodiment of the inventive method has been performed.

FIG. 12 shows the satellite 2 in the orbit plane 15 one-half sidereal day later, i.e. at the point of maximum descension. In this case, to point the beam axis 112 at the bore site target 66, the spin axis 13 of the satellite 2 is oriented at a direction angle Ω which exceeds the angular difference between equatorial-normal and orbit-normal by a correction angle $\beta$. In FIG. 12, only the beam axis 112 of the conical beam has been shown to avoid confusion. So that the point 41 at which the beam axis strikes the earth 1 will coincide with the bore site target 66 (i.e. to rotate the beam axis represented by the line 112 to the beam axis represented by a line 212), the spin axis 13 must be oriented at an angle with respect to equatorial-normal $E_N$ greater than the inclination angle I, as the point 41 is south of the bore site target 66 when the spin axis is at orbit-normal $O_N$. The direction angle Ω is equal to the inclination angle I plus the correction angle $\beta$, and is measured in a rotational direction from a first line representing equatorial-normal $E_N$ toward a second line representing orbit-normal $O_N$, where the first and second lines intersect at the center of mass of the satellite 2.

Figure 13A:
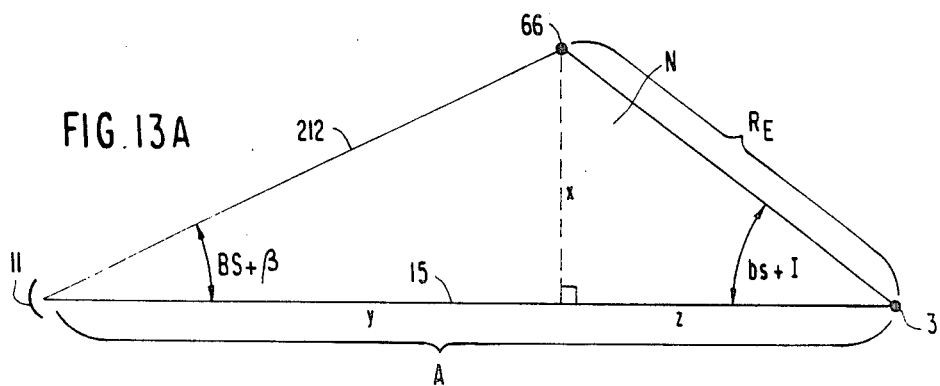
FIG. 13A is an enlarged diagram of a portion of FIG. 12 for purposes of calculating a correction angle according to the second embodiment of the inventive method.

The correction angle $\beta$ derived for a satellite at the point of maximum descension, e.g. noon, may be calculated with reference to FIGS. 12 and 13A, and specifically to a triangle N formed by the center 3 of the earth 1, the bore site target 66 and the antenna 11 of the satellite 2, and will be given by the following equation (Equation (5)):

$$\beta = |(-\{BS - \tan^{-1}([\sin(bs+I)]/[6.61 - \cos(bs+I)])\})| \quad (5)$$

The minus sign nearest the front of the right-hand side of Equation (5) arises because the derivation of Equation (5) does not take into account the fact that the antenna 11 at noon is rotated 180° from its position at midnight so that the antenna continues to face the earth 1. Since the direction angle at noon must be greater than the inclination angle I, a positive value of the correction angle β at noon must be added to the inclination angle I. Therefore, β is taken as equal to the absolute value of the right hand side of Equation (5).

It is to be noted that, for any given inclination angle I, the magnitude of the correction angle β as determined by Equation (1) will be slightly different from that determined by Equation (5), due to the difference in the triangles N (FIG. 13A) and M (FIG. 11) formed the points of maximum ascension and descension, respectively. This slight difference is reflected in the sine and cosine terms where the inclination angle I is added to the latitude bs of the bore site in Equation (5), but subtracted in Equation (1). As a result, the correction angle determined by Equation (1) will be slightly greater than the correction angle determined by Equation (5). To compensate for the slight difference in equations (1) and (5), both can be used to determine the magnitudes of the correction angles β, and then an average may be taken, for example.

It is well-known in the art that a maximum inclination angle of around 15° will taken about 27 years in the absence of north/south control and will return to 0° to about 53 years. The correction angle β will be very small and the total amount of roll will be minimal for inclination angles up to the maximum. As shown in Table I, a corresponding correction angle β for each of various inclination angles I was calculated using each of the Equations (1) and (5). The latitude bs of the bore site target 66 was taken to be 40° and the elevation angle BS of the bore site target 66 in spacecraft coordinates was taken to be 6.3°. Thus, with reference to Table I (below), the maximum difference between the correction angles β of Equations (1) and (5), when the inclination angle I is a maximum of 15°, will not be about 0.62°. As can be seen from the Table I, for many values of the inclination angle I, the correction angle β could be chosen anywhere in a range from the result of Equation (1) to the result of Equation (5), as this range will be relatively narrow.

| I | β (at maximum ascension) | β (at maximum descension) |
|---|---|---|
| 1° | 0.14° | 0.09° |
| 2° | 0.26° | 0.21° |
| 3° | 0.39° | 0.32° |
| 4° | 0.51° | 0.43° |
| 5° | 0.64° | 0.53° |
| 10° | 1.32° | 1.02° |
| 15° | 2.06° | 1.44° |

Similar to as in the method according to the first embodiment of the invention, the step of orienting the spin axis 13 of the satellite 2 at the direction angle Ω can be performed at any position of the satellite in its orbital path (not shown) in the orbital plane 15.

As previously mentioned, the purpose of the above-described second embodiment of the inventive method is to point the beam axis at the bore site target, to ensure that the beam will adequately cover the target site. However, if the inclination angle I is sufficiently small, or if the satellite is using an antenna with a relatively wide beam, it is possible to adequately cover the target site by orienting the spin axis at a direction angle Ω anywhere within a broad range of values, such as from the inclination angle I to the inclination angle plus two times the correction angle β, with respect to equatorial-normal $E_N$. For example, when the inclination angle I equals 0.2°, for most types of beams, the spin axis could be oriented anywhere within a range from 0.2° to 0.29° with respect to equatorial-normal $E_N$ (using Equation (1) for the correction angle β and the values of the bore site target angle in spacecraft coordinates BS and in earth coordinates bs used to derive Table I).

The above-described second embodiment of the inventive method has been explained as an adjustment or a correction of the spin axis attitude from orbit-normal to aid in the understanding of the method. The spin axis of the satellite may be oriented at the direction angle Ω (which preferably equals the inclination angle I plus the correction angle β) with respect to equatorial-normal without ever having been oriented at orbit-normal. In fact, as noted with respect to the first embodiment of the inventive method, the satellite can be launched directly into an inclined orbital plane, and the spin axis can then be oriented at the direction angle Ω for that particular plane.

It should be understood that in the inventive method the bore site target 66 has arbitarily been chosen to have an elevation angle BS equal to positive 6.3° and an azimuth angle (with respect to the position of the satellite) of zero, the bore site target may be at any desired elevation and azimuth angle of the globe and the inventive method will be the same.

In conjunction with the first and second embodiments of the invention, the desired attitude of the spin axis of the satellite is achieved by firing thrusters for controlling the angle at which the spin axis is oriented. The steps of determining the angle at which to orient the spin axis, and fire the thrusters to orient the spin axis at the determined direction angle, may be accomplished by resort to attitude control apparatus and programs well-known in the art and currently in use.

Specifically, control of the orientation of the spin axis of a satellite is conventionally performed by firing thrusters provided on the satellite. The necessary thrusting parameters (e.g. thruster on time, phasing or frequency of thrusting) to achieve any desired attitude are determined through the use of an orbital mechanics computer program (an orbit determination computer program). Such an orbit determination computer program is currently sold by several computer software companies (e.g. Computer Sciences Corporation). An example of how the inventive method may be implemented is as follows:

An earth station can track the satellite and collect tracking and range data indicative of the range to the satellite as well as the elevation and azimuth angles with respect to station coordinates, as is well-known in the art. For example, to determine the range to the satellite, earth station personnel perform an operation known as "ranging". That is, a signal is sent toward the satellite and the time from when the signal is sent until a corresponding signal returns is measured. To determine the angles to the satellite, a ground antenna is used to sense the direction from which the beam from the satellite is strongest. Angle and range data may be calculated frequently, e.g. every fifteen minutes, over a predetermined period of time, e.g. a week.

The locus of determined range and angle data may then be relayed to orbital mechanics experts who may be located at a laboratory remote from the earth station. The orbital mechanics experts can input the data into a computer. The orbit determination computer program may be used to calculate, based on orbital mechanics laws, a "best fit" present orbit and the corresponding present orbital parameters of the satellite to describe the orbit. Outputted orbital parameters include the inclination angle with respect to the equatorial plane, the eccentricity, the period of orbit, the position of the satellite and the angular speed of the satellite. Using these calculated, present orbital parameters, in conjunction with orbital mechanics laws and factors such as the obliqueness of the earth, solar pressure and the sun/moon gravitational attractions, the future orbital parameters can be predicted by the program. In addition, telemetry data received from the satellite can be used by the computer program to determine the present and predicted future precession or attitude of the spin axis. A variety of telemetry data is acceptable, including data indicative of the direction of the sun with respect to the spin axis.

With the above orbital parameters and attitude information calculated and outputted by the computer program, the proper thruster parameters to orient the spin axis along the desired direction can be determined. For example, to orient the spin axis according to the second embodiment of the invention, the orbital mechanics experts use the calculated inclination angle and the desired angle of the bore site target in both earth coordinates and spacecraft coordinates to determine the correction angle, e.g. using Equation (1). The correction angle is then added to the outputted inclination angle to get the desired direction angle for the present orbit. The required thruster on time and phasing to bring the spin axis to the direction angle are then determined using vector analysis.

With reference to FIG. 13B in which the spin axis 13 of a satellite (not shown) is currently oriented at the angle $\tau$ with respect to equatorial-normal $E_N$, there is an incremental momentum vector $\delta H$ in a direction perpendicular to an initial total momentum vector $H_i$, which can be added to the initial angular momentum vector of the satellite to achieve a final momentum vector $H_f$ along the desired direction angle $\Omega$.

The thruster on time is calculated using the magnitude of the incremental momentum vector $\delta H$ given by the following equation: $\delta H = H_i \times \tan(\Omega - \tau)$, where $\tau$ is the current angle of the spin axis with respect to equatorial-normal. The magnitude of the initial total momentum vector can be calculated using the orbital parameters (including angular speed) outputted by the orbit determination program. The thruster on time $\delta t$ is equal to the magnitude of the incremental momentum vector $\delta H$ divided by the quantity of the thruster force (a known design value) multiplied by the thruster moment arm (also a known design value). The phasing of the thrusters is calculated so as to rotate the spin axis in the direction of the incremental momentum vector $\delta H$, which is defined as perpendicular to the direction of the initial momentum vector $H_i$ (which is simply the current spin axis attitude outputted by the orbit determination program). The on time and phasing data calculated by the orbital mechanics experts can then be relayed to a control center, where the data can be transmitted to the satellite in the form of commands to fire and thrusters accordingly.

The use of thrusters for orienting the spin axis of the satellite at the direction angle is particularly effective as it can easily be applied to satellites already in orbit. Further, as noted above, the correction can be made just once during any given orbital path. It would also be possible to use a magnetic torquing device which is also capable of making the correction just once during the orbital path. In the case of using a magnetic torquing device to orient the spin axis at a desired direction angle, the incremental momentum vector $\delta H$ is the same as in the case where thrusters are used. However, it would be expensive and impractical to equip a spin stabilized satellite with a magnetic torquing device sufficient to change the momentum vector of the spin axis, as the angular momentum of a rotating portion of structure is much greater than that of an internal gyroscope.

Since the direction angle $\Omega$ will change whenever the inclination angle I changes, attitude adjustments should be made periodically to keep the spin axis at the proper direction angle $\Omega$. The attitude adjustments necessary to achieve and maintain the spin axis at the direction angle $\Omega$ may be made often, as only a relatively small amount of fuel is needed for correcting attitude. For instance, on a COMSTAR (Trademark) satellite, attitude corrections are made every three days, yet only about 1 pound of fuel is consumed in a year. East/west position corrections are made every thirty days and north/south corrections are made every three months. In the method according to the invention, corrections may be made in the same or a similar schedule, except that the north/south corrections need not be made.

Figure 14A:
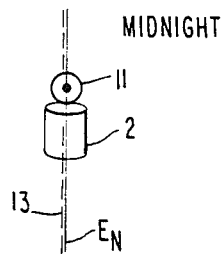
FIGS. 14A-14D are explanatory diagrams showing the tilt of a satellite, as viewed from the earth, which has been oriented according to the second embodiment of the invention, at midnight, dawn, noon and dusk, respectively.
Figure 14B:
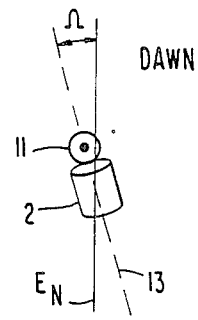
Figure 14C:
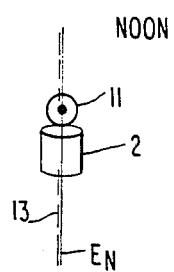
Figure 14D:
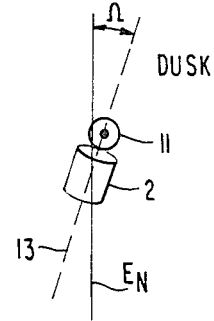

FIGS. 14A-14D show the satellite 2, oriented according to the second embodiment of the inventive method, as viewed from the earth at various times of the day. In using the method according to the invention, due to the law of conservation of angular momentum, once the spin axis 13 has been oriented at the direction angle $\Omega$, the spin axis will have a "tilt" or roll (a rotation) directly towards the earth at midnight and directly away from the earth at noon. Similarly, to an observer looking at the satellite 2 from the earth, when the satellite is at dawn (i.e. in the equatorial plane 5 and descending) or at dusk (i.e. in the equatorial plane and ascending), the spin axis 13 will have a "tilt" or yaw to the left (east) or the right (west) from equatorial-normal $E_N$ by the direction angle $\Omega$, as shown in FIGS. 14B and 14D, respectively. Thus, at dawn and at dusk, the spin axis of the satellite 2 will have no roll toward or away from the earth. The law of conservation of angular momentum thus causes the component of roll of the spin axis toward the earth to decrease from a maximum of $\Omega$ at midnight to zero at dawn. Similarly, the component of roll away from the earth will increase from zero at dawn to a maximum of $\Omega$ at noon. From noon to dusk the component of roll away from the earth will decrease from the maximum $\Omega$ to zero, and from dusk to midnight the component of roll toward the earth will increase from zero to the maximum of $\Omega$.

The fact that the component of roll toward or away from the earth is constantly changing as the satellite revolves around the earth does not prevent the antenna from continuing to be substantially pointed at the bore site target. For example, referring back to FIG. 11, when the satellite 2 in the orbital plane 15 is at midnight (where the excursion to the north is a maximum), the maximum roll of the direction angle $\Omega$ toward the earth is necessary to point the axis 112 of the beam 12 at the bore site target 66. As the satellite 2 moves from midnight to dawn, the amount of excursion to the north decreases to zero. Therefore, the amount of roll of the spin axis 13 toward the earth 1 necessary to point the axis 112 of the beam 12 at the bore site target 66 will also decrease from the maximum ($\Omega$) to zero. When the satellite 2 is at dawn, the satellite is in the equatorial plane 5 where no roll toward or away from the earth 1 is necessary to point the beam axis 112 at the bore site target 66, as can be seen by referring back to the dotted satellite 2a in FIG. 3. Therefore, no further adjustment of the amount of roll of the spin axis 13 (to point the beam axis 112 at the bore site 66) will be necessary once the spin axis is oriented at the direction angle $\Omega$.

When the satellite 2 moves from dawn to noon, the amount of excursion to the south increases. Therefore, the amount of roll of the spin axis 13 away from the earth needed to point the beam axis 112 at the bore site target 66 will increase from zero to a maximum amount of $\Omega$ away from the earth. Since, due to conservation of angular momentum, the amount of roll of the spin axis 13 away from the earth 1 increases from zero at dawn to a maximum amount (equal to the direction angle $\Omega$) at noon, no further adjustment of the amount of roll of the spin axis 13 will be necessary once the spin axis is oriented at the direction angle $\Omega$.

Similarly, when the satellite 2 moves from noon to dusk, the amount of excursion to the south decreases from a maximum ($\Omega$) to zero. Therefore, the amount of roll of the spin axis 13 away from the earth 1 necessary to point the beam axis 112 at the bore site target 66 will decrease from the maximum ($\Omega$) to zero. Since the amount of roll of the spin axis 13 away from the earth 1 decreases from the maximum amount ($\Omega$) at noon to zero at dusk, no further adjustment of the amount of roll away from the earth will be necessary once the spin axis is oriented at the direction angle $\Omega$.

When the satellite 2 moves from dusk to midnight, the amount of excursion to the north increases from zero to a maximum ($\Omega$). Therefore, the amount of roll of the spin axis 13 away from the earth 1 necessary to point the beam axis 112 at the bore site target 66 increases from zero at dusk to the maximum amount ($\Omega$) at midnight. Since the amount of roll toward the earth 1 increases from zero at dusk to the maximum amount ($\Omega$) at midnight, no further adjustment of the amount of roll of the spin axis will be necessary once the spin axis is oriented at the direction angle $\Omega$.

Figure 15:
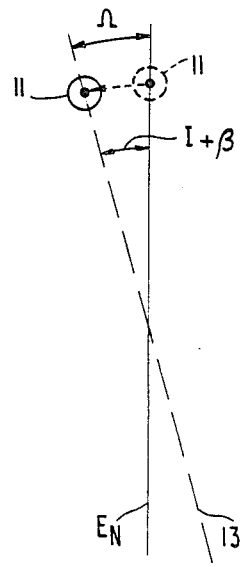
FIG. 15 is an explanatory diagram of a view from the earth of the satellite, oriented according to the second embodiment of the inventive method, at dawn showing the conversion of the direction angle of the spin axis into an apparent yaw angle.

As explained above, the spin axis 13, once oriented at the direction angle $\Omega$, will have the necessary roll toward or away from the earth 1 to point the beam axis 112 at the bore site target 66 at all positions in the orbital path (not shown) in the orbital plane 15. However, as also explained above, the spin axis 13 will have a component of yaw ("tilt" or rotation to the east or west) due to conservation of angular momentum. Referring again to FIGS. 14A–14D, the component of yaw will be zero at midnight and at noon, and the maximum amount ($\Omega$) at dawn and at dusk. Referring to FIG. 15, it can be seen that at dawn, for example, the component of yaw will cause relatively small displacements of the antenna 11 to the south and the east, respectively. Therefore, the point at which the beam axis strikes the earth will be shifted to the south and the east by corresponding relatively small amounts. For a given inclination angle I of the orbital plane, the maximum shift to the south and east will occur at dawn and the maximum shift to the south and west will occur at dusk. With reference to Table I (above), the maximum direction angle $\Omega$ (where $\Omega = I + \beta$) will be 17°, the associated southern shift and eastern shift will be only 0.28° and 1.83°, respectively, for a bore site latitude bs of 40°. If desired, the smaller, southern shift can easily be compensated for on those satellites having an antenna which can be slightly rotated to shift the beam north, as needed.

As is evident from FIG. 15, since the eastern displacement is greater than the southern displacement of the antenna 11, the eastern shift (or western shift at dusk) of the point at which the beam axis strikes the earth will be greater than the southern shift, although the amount which the conical beam will shift with respect to the target site will still be negligible. However, near dawn and dusk, the shift from the bore site target of the point at which the beam axis strikes the earth may have a significant effect on tracking of the satellite and the like. Nevertheless, even if the effect on tracking operations is significant, correction for the east/west shifting can easily be made by known means. For example, the rotation effect due to conservation of angular momentum can easily be tracked by known tracking mechanisms, and the tracking mechanisms or transmitting antenna can be moved to the east or west accordingly. Alternatively, adjustments may be made to the satellite 2 to keep the tracking antenna in communication with the satellite antenna. Such adjustments are well-known in the art. In fact, in the on board beacon tracking closed loop control system (currently used by Satellite Business Systems Corporation, for example), the satellite's antenna is automatically moved east/west in response to any east/west shifting of the beam axis relative to the bore site target.

In addition to the south and east/west shifting due to the direction angle $\Omega$ of the spin axis, use of the method according to the invention will cause some loss of beam coverage around the northern edge of the earth when the satellite is experiencing southern excursions and the southern edge of the earth when the satellite is experiencing northern excursions due to the increased aspect angle. However, coverage of the northern and southern edges of the earth is not necessary for the great majority of applications.

The above-described method for orienting a geostationary satellite according to the invention can be easily performed, as all of the necessary mechanisms to carry out the method are well-known in the art. Therefore, the advantage of vastly prolonging the useful life of a satellite can be easily achieved, even with satellites already in orbit. Moreover, in designing new satellites, the necessary fuel (or other propellants) to be stored on board can be greatly reduced. In addition, it is not necessary to accurately launch the satellite into the equatorial plane. Therefore, fuel, which may have been otherwise allocated, needed to move a satellite which has been launched into an inclined plane into an equatorial plane can be saved. Further, the inclination angle can be kept from becoming relatively large for a maximum amount of time by launching the satellite at an angle with respect to the equatorial plane which if chosen correctly will decrease in inclination before increasing.

The embodiments of the invention as shown and described herein are considered only as illustrative of the principles of the invention, as variations may be made which would come within the spirit and scope of the foregoing description and the following claims.

I claim:

1. A method of orienting a satellite (2), said satellite being spin stabilized about a spin axis (13), said satellite having a beam (12) emanating from an antenna (11) on said satellite, said satellite being in an orbit in a first plane (15), said first plane having an inclination angle (I) with respect to a second plane (5) encompassing the equator (4) of the earth (1), said method comprising the steps of:

(a) determining a direction angle ($\Omega$) at which to orient said spin axis when said inclination angle of said first plane is greater than zero, said direction angle being defined in a rotational direction from a first line ($E_N$) normal to said second plane toward a second line ($O_N$) normal to said first plane, said first and second lines intersecting at the center of mass of said satellite, and said angle being sufficient, considering beam pattern and divergence, to cause said beam to substantially cover a target area throughout said entire orbit of said satellite without any north/south correction of said satellite; and (b) orienting said axis of said satellite substantially at said direction angle, wherein said direction angle is equal to said inclination angle plus one half of a sum of a first correction angle calculated for when said satellite is at a point of maximum descension in said orbit and a second correction angle calculated for when said satellite is at a point of maximum ascension in said orbit, said first and second correction angles being calculated such that an axis of said beam is directed at the same target point within the target area when said satellite is at the point of maximum descension as when said satellite is at the point of maximum ascension.

2. A method of orienting a satellite according to claim 1, wherein said satellite has thrusters for controlling the attitude of said spin axis, and said step of orienting said spin axis at said direction angle is performed by firing said thrusters.

3. A method of orienting a satellite (2), said satellite being stabilized about an axis (13), said satellite having thrusters for controlling the attitude of said axis and having a beam (12) emanating from an antenna (11) on said satellite, said satellite being in an orbit in a first plane (15), said first plane having an inclination angle (I) with respect to a second plane (5) encompassing the equator (4) of the earth (1), said method comprising the steps of:

(a) determining a direction angle ($\Omega$) at which to orient said axis when said inclination angle of said first plane is greater than zero, said direction angle being defined in a rotational direction from a first line ($E_N$) normal to said second plane toward a second line ($O_N$) normal to said first plane, said first and second line intersecting at the center of mass of said satellite, and said angle being sufficient, considering beam pattern and divergence, to cause said beam to substantially cover a target area throughout said entire orbit of said satellite without any north/south correction of said satellite;

(b) determining thrusting parameters for orienting said axis at said direction angle; and (c) orienting said axis of said satellite substantially at said direction angle by firing said thrusters, wherein said direction angle is equal to said inclination angle plus one half of a sum of a first correction angle calculated for when said satellite is at a point of maximum descension in said orbit and a second correction angle calculated for when said satellite is at a point of maximum ascension in said orbit, said first and second correction angles being calculated such that an axis of said beam is directed at the same target point within the target area when said satellite is at the point of maximum descension as when said satellite is at the point of maximum ascension, wherein said first correction angle is calculated as follows:

$$\beta_1 = |-(BS - \tan^{-1}\{(\sin(bs+I))/(6.61 - \cos(bs+I))\})|,$$

and wherein said second correction angle is calculated as follows:

$$\beta_2 = BS - \tan^{-1}\{(\sin(bs-I))/(6.61 - \cos(bs-I))\},$$

wherein $\beta_2$ = said first correction angle, $\beta_2$ = said second correction angle, BS = the elevation angle of a desired bore site target in spacecraft coordinates, bs = the latitude of said desired bore site target, and I = said inclination angle.

4. A method of orienting a satellite according to claim 3, wherein said satellite is spin stabilized about said axis.

5. A method of orienting a satellite (2), said satellite being stabilized about an axis (13), said satellite having a magnetic torquing mechanism for controlling the attitude of said axis and having a beam (12) emanating from an antenna (11) on said satellite, said satellite being in an orbit in a first plane (15), said first plane having an inclination angle (I) with respect to a second plane (5) encompassing the equator (4) of the earth (1), said method comprising the steps of:

(a) determining a direction angle ($\Omega$) at which to orient said axis when said inclination angle of said first plane is greater than zero, said direction angle being defined in a rotational direction from a first line ($E_N$) normal to said second plane toward a second line ($O_N$) normal to said first plane, said first and second lines intersecting at the center of mass of said satellite, and said angle being sufficient, considering beam pattern and divergence, to cause said beam to substantially cover a target area throughout said entire orbit of said satellite without any north/south correction of said satellite;

(b) determining an incremental amount of torque for orienting said axis at said direction angle; and (c) orienting said axis of said satellite substantially at said direction angle by use of said magnetic torquing mechanism, wherein said direction angle is equal to said inclination angle plus one half of a sum of a first correction angle calculated for when said satellite is at a point of maximum descension in said orbit and a second correction angle calculated for when said satellite is at a point of maximum ascension in said orbit, said first and second correction angles being calculated such that an axis of said beam is directed at the same target point within the target area when said satellite is at the point of maximum descension as when said satellite is at the point of maximum ascension, wherein said first correction angle is calculated as follows:

$$\beta_1 = |-(BS - \tan^{-1}\{(\sin{(bs+I)})/(6.61-\cos{(bs+I)})\})|,$$

and wherein said second correction angle is calculated as follows:

$$\beta_2 = BS - \tan^{-1}\{(\sin{(bs-I)})/(6.61-\cos{(bs-I)})\},$$

where $\beta_1$ = said first correction angle, $\beta_2$ = said second correction angle, BS = the elevation angle of a desired bore site target in spacecraft coordinates, bs = the latitude of said desired bore site target, and I = said inclination angle.

6. A method of satellite stationkeeping for a geostationary spin stabilized satellite, which method does not require north/south correction of the position of said satellite, said method comprising the steps of:

(a) determining the position of said satellite in orbit, including the inclination angle (I) of the orbit of said satellite;

(b) orienting said satellite at a direction angle with respect to equatorial-normal, wherein said direction angle is equal to said inclination angle plus one half of a sum of a first correction angle calculated for when said satellite is at a point of maximum descension in said orbit and a second correction angle calculated for when said satellite is at a point of maximum ascension in said orbit, said first and second correction angles being calculated such that an axis of said beam is directed at the same target point within the target area when said satellite is at the point of maximum descension as when said satellite is at the point of maximum ascension, and (c) allowing said satellite to drift in a north/south direction such that the inclination angle of the orbit increases from zero to a maximum, and decreases from said maximum to zero, wherein said maximum inclination is approximately 15°.

7. A method of satellite stationkeeping according to claim 6, wherein said step of orienting said satellite at said direction angle is performed by at least one of firing thrusters and use of a magnetic torquing mechanism.

8. A method of satellite stationkeeping for a geostationary satellite, which method does not require north/south correction of the position of said satellite, said satellite having thrusters for cntrolling the orientation of said satellite, said method comprising the steps of:

(a) determining the position of said satellite in orbit, including the inclination angle (I) of the orbit of said satellite;

(b) determining thrusting parameters for orienting said spin axis at a direction angle with respect to equatorial-normal;

(c) orienting said satellite at said direction angle by firing said thrusters, wherein said direction angle is equal to said inclination angle plus one half of a sum of a first correction angle calculated for when said satellite is at a point of maximum descension in said orbit and a second correction angle calculated for when said satellite is at a point of maximum ascension in said orbit, said first and second correction angles being calculated such that an axis of said beam is directed at the same target point within the target area when said satellite is at the point of maximum descension as when said satellite is at the point of maximum ascension, and (d) allowing said satellite to drift in a north/south direction such that the inclination angle of the orbit increases from zero to a maximum, and decreases from said maximum to zero, wherein said maximum inclination is approximately 15°.

9. A method of satellite stationkeeping according to claim 8, wherein said satellite is spin stabilized.

10. A method of satellite stationkeeping for a geostationary satellite, which method does not require north/south correction of the position of said satellite, said satellite having a magnetic torquing mechanism for controlling the orientation of said satellite, said method comprising the steps of:

(a) determining the position of said satellite in orbit, including the inclination angle (I) of the orbit of said satellite;

(b) determining an incremental amount of torque for orienting said satellite at a direction angle with respect to equatorial-normal;

(c) orienting said satellite at said direction angle by use of said magnetic torquing mechanism, wherein said direction angle is equal to said inclination angle plus one half of a sum of a first correction angle calculated for when said satellite is at a point of maximum descension in said orbit and a second correction angle calculated for when said satellite is at a point of maximum ascension in said orbit, said first and second correction angles being calculated such that an axis of said beam is directed at the same target point within the target area when said satellite is at the point of maximum descension as when said satellite is at the point of maximum ascension, and (d) allowing said satellite to drift in a north/south direction such that the inclination angle of the orbit increases from zero to a maximum, and decreases from said maximum to zero, wherein said maximum inclination is approximately 15°.

* * * * *